United States Patent [19]

Cohr

[11] Patent Number: 4,633,606
[45] Date of Patent: Jan. 6, 1987

[54] TAG

[75] Inventor: Lindsay W. J. Cohr, Palmerston North, New Zealand

[73] Assignee: Allflex International Limited, Ton North, New Zealand

[21] Appl. No.: 722,727

[22] Filed: Apr. 11, 1985

[51] Int. Cl.$^4$ .......................... A01K 11/00; G09F 3/00
[52] U.S. Cl. ........................................ 40/301; D30/43
[58] Field of Search ........................ D30/43; 119/156; 40/300, 301; 428/122

[56] References Cited

U.S. PATENT DOCUMENTS

| Re. 31,632 | 7/1984 | Murphy et al. | 40/301 |
| D. 170,913 | 11/1953 | Dumbrell et al. | D30/43 |
| 3,357,122 | 12/1967 | Hayes | 40/301 |
| 3,675,357 | 7/1972 | Magee | 40/300 |
| 3,694,949 | 10/1972 | Howe | 40/301 |
| 3,949,708 | 4/1976 | Meeks | 40/301 X |
| 3,952,438 | 4/1976 | Propst et al. | 40/300 |
| 4,060,921 | 12/1977 | Robinson | 40/301 |
| 4,366,777 | 1/1983 | Akhavein et al. | 119/156 |
| 4,495,898 | 1/1985 | Akhavein et al. | 119/156 |

FOREIGN PATENT DOCUMENTS

| 2323322 | 4/1977 | France | 40/301 |
| 2509960 | 1/1983 | France | 40/301 |

Primary Examiner—Henry F. Epstein
Attorney, Agent, or Firm—Blakely, Sokoloff, Taylor & Zafman

[57] ABSTRACT

A one piece tag formed from a resilient plastics material comprises a mounting member and a pair of panels attached thereto. The mounting member has a pair of limb portions coupled together by an intermediate portion. A panel extends from the end of each limb portion. Coupling means is provided adjacent the free end of one panel and an applicator tool can engage the tag via the coupling means. The panel is thus able to be forced through an object, such as the ear of an animal, by the applicator so that the intermediate portion resides within the opening formed in the object and a panel lies either side of the opening.

12 Claims, 3 Drawing Figures

TAG

The invention relates to a tag primarily usable for identification purposes and more particularly but not exclusively to an identification tag for animals.

Tags of a wide variety of types are well known for use in the identification of, or applying information to, animate or inanimate objects. For example, it is well know to use one or two piece flexible or rigid tags for the identification of animals, such tags normally being applied to the ear of an animal. The tags provide a means of identification either by colour coding or by written indicia appearing on the tags. In other applications tags can be used for the identification of animal carcasses in meat processing works, the identification of pelts, mail bags in postal services, wool bales, clothing and many other instances well appreciated by those skilled in the art. The use of tags for identification purposes or the applying of information to objects is thus a well developed art.

Two of the main requirements for tags designed for the aforementioned purposes are that the tag must be readily applied to the object to which it is to be attached and once applied it must remain in place i.e. have high retention characteristics. This is especially so with, for example, animals where the tag should be applied quickly and easily so that the operator does not need to be in close proximity to the animal for any length of time. The tag, however, must be long lasting and remain applied to the animal so that continuity of identification is achieved.

In the sheep industry, and in other small animal industries, there is a need for a simple and low-cost tag which meets the aforementioned requirements of ease of application and retention once applied. Generally tags of one piece construction are cheaper to produce and as a result the tags which have hitherto been popular in the sheep industry are one piece tags. As there are retention problems associated with one piece tags produced from resilient materials the popular sheep tags are produced from a rigid plastics material such as nylon. These tags are usually installed in a pre-punched opening in the animal's ear though in New Zealand patent specification No. 130497 there is disclosed a tag which is designed to be self-piercing. Such a tag is, however, unsuited for its end purpose as it has low retention properties especially if it becomes snagged as it can readily be pulled through the aperture in the ear due to the rigid nature of the limb portions.

Efforts to overcome lack of or low retention of fully flexible one piece tags have resulted in a large number of different tag constructions which generally have a panel of large proportions and a head portion attached to the panel by a neck. The head portions are so designed that they can be compacted during application but assume their normal proportions after application. Due to the size of the head, however, a large opening must be made in the animal's ear and such an opening is slow to heat. Even when healing has taken place the head is still prone to be pulled back out through the opening.

The present invention, however, provides a flexible one piece tag which has by virtue of its construction a high retention characteristic even though it does not rely on any physical coupling or closing of one part of the tag with another part nor an enlarged head portion, the sole purpose of which is to retain the tag in place. Only a small opening need be formed during application of the tag, application of the tag being simultaneous with forming the opening and thus whilst the tag is particularly suited for small animals such as sheep it can equally be used in other applications where there is a requirement that only a small opening be formed in the object to be tagged.

The present invention has as its object to provide a tag which is of a simple and low-cost construction, can be readily applied to an animate or inanimate object and will remain attached to that object.

In its broadest aspect the present invention provides a one piece tag formed from a resilient plastics material said tag comprising a mounting member and a pair of panels attached thereto, said mounting member having a pair of limb portions coupled together by an intermediate portion, a said panel extending from the end of each said limb.

BRIEF DESCRIPTION OF THE DRAWINGS

In the more detailed description of the invention which follows reference will be made to the accompanying drawings in which.

Figures 1, 2:
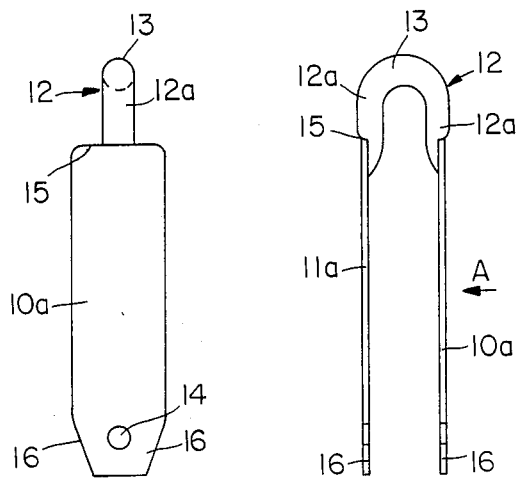
FIG. 1 is a side elevational view of a preferred form of the tag according to the invention.
FIG. 2 is a side elevational view taken in the direction of arrow A.

The preferred form of the tag as illustrated in the drawings is preferably moulded in one piece from a resilient plastics material and as recognised in the art polyurethane is a particularly suitable material especially if the tag is destined for use as an animal identification ear tag. The tag is formed by a pair of body portions 10 and 11 coupled together by a connecting portion 12 which forms a mounting member. In the preferred form the body portions 10 and 11 are in the form of flat elongate panels 10a and 11a. The actual shape and configuration of the or each body portion 10 and 11 can be altered depending on the end use of the tag, however, it is desirable that at least body portion 10 be a flat narrow elongate panel of the general type depicted in the drawings.

The mounting member 12 is preferably of a circular, eliptical or like curved cross section and is formed with a curved intermediate portion 13 situated approximately medially in its length. The intermediate portion is thus of a substantially inverted V or U shape. Preferably the distance between the leg portions 12a is substantially equal to the thickness of the animal's ear for which the tag is destined to be used so that the mounting portion is a snug fit with the ear. In a modified form only intermediate portion 13 is necessarily of curved cross section.

Panels 10a and 11a are formed with an opening 14 at or near its outer end. This opening 14 forms a coupling means which is engagable by a projection on the applicator spear of an applicator tool. Such an applicator tool, can, for example, be of the type described in our New Zealand Patent Specification No. 205908 which is of a pliers type arrangement having a handle and a lever with the lever being operable to move an applicator spear toward a fixed support surface or alternatively to move the support surface toward a fixed spear.

When the tag is applied to, for example, an animal's ear one of panels 10a or 11a is coupled to the applicator spear by opening 14 being passed over a projection on the spear. The spear is then moved to engage with the animal's ear which is at least partly supported by the support surface such as to allow the spear to pass through the ear and thus draw with it the panel attached thereto until the intermediate portion 13 is situated in the opening formed in the ear. The spear is then retracted to leave the tag situated in the animal's ear.

With the panel being of a flat narrow configuration the opening required to be formed in the animal's ear is kept to a minimum and is such as to be only slightly larger than the cross sectional shape of the connecting portion 12. Due to the elongate nature of the panel it tends to curve about the spear during application and this ensures that only a small opening is formed in the ear. If required a guide slot or the like can be formed in the applicator tool such that this deformation of the panel is forced to occur during application. This deformation of the panel during application can also be encouragted by the inclusion of inclined leading edges 16 as shown in FIG. 2.

The tag therefore hangs in the animal's ear in the orientation as shown in FIG. 1 with the bent intermediate portion 13 of the mounting member 12 being situated within the ear and a panel 10a and 11a situated to the front and rear of the ear. As it is only panel 10a which must pass through the animal's ear then the need for a thin narrow panel forming body portion 11 is not required and therefore this panel can be of substantially greater overall dimension to thereby provide an area in which identification indicia can be positioned. The tag in the configuration shown in the drawings can likewise be marked with indicia of limited dimensions and thus whilst primarily a tag of this size would only be usable for identification by colour coding, the present tag can bear indicia. The size of the tag is such that it is entirely suitable for use on small animals such as sheep and lambs.

Figure 3:
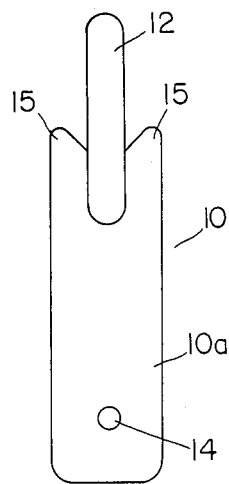
FIG. 3 is a side elevational view similar to that of FIG. 2 but showing a modified form of the invention.

Whilst the physical dimensions and in particular the transverse width of the panels 10a and 11a which form shoulders 15 will serve to maintain the tag in position it is a preferred form of the invention shown in FIG. 3 that one or more projections be formed with the panels 10a and 11a so as to serve as a means of preventing the panels from being drawn back through the opening in the aniimal's ear. In the illustrated form each of the panels 10a and 11a is provided with lobes 15a which are moulded as an integral part and project back toward the intermediate portion 13 of the mounting member 12. As an alternative or an addition thereto projections can also be formed so as to project outwardly and inwardly relative to the flat surfaces of the panels.

The tag according to the invention is extremely simple and thus economical to produce construction and is usable in many applications where animate and inanimate objects nesed to be identified. The tag is particularly useful for identification by colour coding, however, indicia can be marked on the panels 10a and 11a especially if one panel is made of greater dimensions. Alternatively a separate identification or information panel can be attached to the tag when installed and, for example, this can be achieved by a panel (not shown) having a projection which can be press fitted into the opening 14.

The tag can be readily applied by a pliers type applicator tool and only a small opening need to be formed in the object to which the tag is to be applied. Once in place the panels lie one either side of the ear and are maintained in such position by the relatively thick dimensioned mounting member 12. The thin flexible panels are such that they resist snagging, however, even though the mounting member is, relative to the thin panels, less flexible than the panels it is sufficiently flexible to resist snagging. The less flexible nature of the mounting member and its disposition above the terminal ends of the panels materially assists, it is believed, the high retention characteristics of the tag as even when one panel is snagged on an immovable object it is difficult to deform the mounting member to a position where it is sufficiently "flattened out" to enable the tag to be drawn through the opening in the ear. Usually the extremely flexible panel would become free before this deformation of the mounting member could take place.

Whilst the shoulders 15 also play a part in ensuring the tag is retained even when snagged it has been found that during application the opening formed in the ear of the animal is substantially round and of such small dimensions that it quickly heals so that the mounting member can rotate therein. The curved surface of the mounting member ensures that the opening does not become enlarged as a result of such rotation taking place.

Due to the simple nature of the construction of the tag it is cheap to produce. The symmetrical nature of the tag also leads to simplification of application as the person applying the tag does not first need to determine which panel is the one to pass through the ear and thus be attached to the applicator spear. Even though the panels are narrow elongate forms they can carry up to five digits and to this end the limb portion 12a of the mounting member 12 does not overlap the front surface of the panel.

The tag can also be applied via the front of the ear of an animal (this being once again possible because of its symmetrical nature) and accordingly ensures in sheep that wool is not dragged through the wound. Accordingly it has been found the necrosis of the ear is not a problem with the tag.

Finally the curved or U/V shaped mounting member plus the thin flexible panels do not present any possibility of damage to the combs of shearing handpieces when the tag is used as a sheep tag.

I claim:

1. A one piece tag formed from a resilient plastics material said tag comprising a mounting member and a pair of panels attached thereto, said panels being in a spaced apart, substantially parallel disposition, said mounting member having a pair of limb portions coupled together by an intermediate portion, the cross sectional configuration of said mounting member being such that it is less flexible than said panels, said panels extending from the end of each said limb portion.

2. A tag as claimed in claim 1 wherein at least one of the said panels is of thin elongate form with the limb portion attached thereto projecting from one end thereof, the other end having coupling means incorporated therewith whereby the panel can be coupled to an applicator tool.

3. A tag as claimed in claim 2 wherein the coupling means is an opening.

4. A tag as claimed in claim 2 wherein at least the intermediate portion of the mounting member is of substantially circular cross-section.

5. A tag as claimed in claim 4 wherein the diameter of the circular cross-section is substantially greater than the thickness of said at least one panel but less than the width of said at least one panel.

6. A tag as claimed in claim 1 wherein the intermediate portion is of generally curved shape such that the mounting member is of substantially U shape.

7. A tag as claimed in claim 2 wherein the side edges of said at least one panel adjacent the free end thereof converge inwardly toward said one end.

8. A tag as claimed in claim 7 wherein the coupling means is located within the area of the panel bounded by said converging side edges.

9. A tag as claimed in claim 2 wherein said panels are substantially identical and are located in a face to face spaced apart disposition.

10. A one piece animal ear tag formed from a resilient plastics material comprising a substantially U shaped mounting member of substantially circular cross-section, a panel attached to and extending from each limb portion of the U shaped mounting member, said limb portions being spaced apart by a distance approximately equal to the thickness of the ear of an animal through which the mounting member is to be installed, the side edges of at least one panel adjacent the free end of the panel converging inwardly toward said free end and coupling means incorporated adjacent said free end for coupling of said tag to an applicator tool, the circular cross-section of the mounting member being significantly greater than the thickness of said panels such that the panels are of greater flexibility than the mounting member.

11. A tag as claimed in claim 10 wherein each said limb portion extends away from said panel in a direction in line with or parallel to the longitudinal axis of symmetry of the panel.

12. A tag as claimed in claim 11 wherein the edge of the panel where it joins with the limb portion forms a shoulder projecting either side of the join between the limb portion and the panel.

* * * * *